US008691102B1

United States Patent
Araki et al.

(10) Patent No.: US 8,691,102 B1
(45) Date of Patent: Apr. 8, 2014

(54) METHOD OF MANUFACTURING PLASMON GENERATOR

(71) Applicants: Hironori Araki, Milpitas, CA (US); Yoshitaka Sasaki, Santa Clara, CA (US); Hiroyuki Ito, Milpitas, CA (US); Yukinori Ikegawa, Milpitas, CA (US); Seiichiro Tomita, Milpitas, CA (US); Shigeki Tanemura, Milpitas, CA (US)

(72) Inventors: Hironori Araki, Milpitas, CA (US); Yoshitaka Sasaki, Santa Clara, CA (US); Hiroyuki Ito, Milpitas, CA (US); Yukinori Ikegawa, Milpitas, CA (US); Seiichiro Tomita, Milpitas, CA (US); Shigeki Tanemura, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/731,754

(22) Filed: Dec. 31, 2012

(51) Int. Cl.
*C03C 15/00* (2006.01)

(52) U.S. Cl.
USPC .................................. 216/41; 216/59; 438/9

(58) Field of Classification Search
None
See application file for complete search history.

(56) References Cited

U.S. PATENT DOCUMENTS

| 7,655,269 | B2* | 2/2010 | Mayer et al. | 427/2.13 |
| 7,911,883 | B2 | 3/2011 | Sasaki et al. | |
| 8,509,038 | B1* | 8/2013 | Sasaki et al. | 369/13.33 |
| 8,537,645 | B1* | 9/2013 | Chou et al. | 369/13.24 |
| 2011/0165382 | A1* | 7/2011 | Gogolides et al. | 428/156 |
| 2012/0315716 | A1* | 12/2012 | Araki et al. | 438/31 |
| 2013/0107681 | A1* | 5/2013 | Sasaki et al. | 369/13.33 |

* cited by examiner

*Primary Examiner* — Binh X Tran
*Assistant Examiner* — David Cathey, Jr.
(74) *Attorney, Agent, or Firm* — Oliff PLC

(57) ABSTRACT

A method of manufacturing a plasmon generator includes the steps of: forming an etching mask on a dielectric layer; forming an accommodation part by etching the dielectric layer using the etching mask; and forming the plasmon generator to be accommodated in the accommodation part. The step of forming the etching mask includes the steps of: forming a patterned layer on an etching mask material layer, the patterned layer having a first opening that has a sidewall; forming a structure by forming an adhesion film on the sidewall, the structure having a second opening smaller than the first opening; and etching a portion of the etching mask material layer exposed from the second opening.

14 Claims, 8 Drawing Sheets

000
METHOD OF MANUFACTURING PLASMON GENERATOR

BACKGROUND OF THE INVENTION

1. Field of the Invention

The present invention relates to a method of manufacturing a plasmon generator for use in thermally-assisted magnetic recording where a recording medium is irradiated with near-field light to lower the coercivity of the recording medium for data writing.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head section including a magnetoresistive element (hereinafter, also referred to as MR element) for reading and a write head section including an induction-type electromagnetic transducer for writing are stacked on a substrate. In a magnetic disk drive, the thin-film magnetic head is mounted on a slider that flies slightly above the surface of a magnetic recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating the near-field light is typically guided through a waveguide, which is provided in the slider, to the plasmon generator disposed near a medium facing surface of the slider.

U.S. Pat. No. 7,911,883 discloses a technology in which the surface of the core of a waveguide and the surface of a plasmon generator are arranged to face each other with a gap therebetween, and evanescent light that occurs at the surface of the core based on the light propagating through the core is used to excite surface plasmons on the plasmon generator. Based on the excited surface plasmons, near-field light is produced.

The plasmon generator has a front end face located in the medium facing surface. The front end face includes a near-field light generating part which generates near-field light. The surface plasmons excited on the plasmon generator propagate along the surface of the plasmon generator to reach the near-field light generating part. As a result, the surface plasmons concentrate at the near-field light generating part, and the near-field light generating part generates near-field light based on the surface plasmons.

In order to reduce the track width of a recording medium for higher recording density, it is required to reduce the near-field light in spot diameter at the recording medium. To achieve this, it is required to reduce the width and height of the front end face of the plasmon generator. Note that the width of the front end face refers to the dimension of the front end face in the track width direction, and the height of the front end face refers to the dimension of the front end face in the direction in which the tracks extend. The width and height of the front end face are both preferably 40 nm or smaller.

The plasmon generator is typically manufactured by photolithography. The following first and second methods are conceivable as examples of methods for manufacturing the plasmon generator by employing photolithography. In the first method, a metal film is etched into the plasmon generator by using an etching mask formed by photolithography. In the second method, a dielectric layer is etched to form therein a groove by using an etching mask formed by photolithography, and the plasmon generator is formed in the groove.

With the first method, it is difficult due to the limitations of photolithography to reduce the width of the front end face of the plasmon generator to 40 nm or smaller. Further, with the first method, even if the width of the front end face of the plasmon generator could be reduced to 40 nm or smaller by etching, part of the plasmon generator would be susceptible to being stripped off from the underlying layer.

With the second method, it is also difficult due to the limitations of photolithography to reduce the width of the groove, and as a result, it is difficult to reduce the width of the front end face of the plasmon generator to 40 nm or smaller.

U.S. Pat. No. 7,911,883 discloses a method of forming a plasmon generator that is V-shaped in cross section parallel to the medium facing surface. In the method, a groove that is V-shaped in cross section parallel to the medium facing surface is initially formed in a dielectric layer, and a dielectric film is then formed in the groove. Thereafter, the plasmon generator is formed in the groove. With this method, however, it is difficult to form with stability the plasmon generator so that its front end face has a width of 40 nm or smaller. The width of the front end face disclosed in U.S. Pat. No. 7,911,883 falls within the range of 50 to 350 nm.

The following is the reason why it is difficult with the aforementioned method to form with stability a plasmon generator whose front end face is 40 nm or smaller in width. The front end face of the plasmon generator formed by the aforementioned method has a nib at a position closest to the bottom of the groove. Such a front end face of the plasmon generator greatly varies in shape of the portion near the nib due to variations in the accuracy of the process for forming the groove or the process for forming the dielectric film. If the aforementioned method is employed to form a plasmon generator whose front end face has a width of 40 nm or smaller, the main part of the front end face will be occupied by the portion that greatly varies in shape as mentioned above. Accordingly, with this method, it is difficult to form with stability a plasmon generator whose front end face has a width of 40 nm or smaller.

OBJECT AND SUMMARY OF THE INVENTION

It is an object of the present invention to provide a method of manufacturing a plasmon generator and a method of manufacturing a near-field light generator that make it possible to manufacture a plasmon generator whose front end face including a near-field light generating part is small in width.

A plasmon generator manufactured by a manufacturing method of the present invention includes a propagation part for propagating a surface plasmon that is excited based on light. The propagation part has a lower surface, an upper surface opposite to the lower surface, a first side surface and a second side surface that are opposite to each other and connect the upper surface and the lower surface to each other, and a front end face that connects the upper surface, the lower surface, the first side surface and the second side surface to each other. The front end face includes a near-field light generating part that generates near-field light based on the surface plasmon.

The method of manufacturing the plasmon generator of the present invention includes the steps of: forming a dielectric layer having an upper surface; forming an etching mask on the upper surface of the dielectric layer; etching the dielectric layer by using the etching mask and thereby forming in the dielectric layer an accommodation part for accommodating the plasmon generator; and forming the plasmon generator to be accommodated in the accommodation part.

The step of forming the etching mask includes the steps of forming an etching mask material layer on the upper surface of the dielectric layer, the etching mask material layer having an upper surface; forming a patterned layer on the upper surface of the etching mask material layer by photolithography, the patterned layer having a first opening, the first opening having a sidewall lying outside the outer edges of the planar shape of the accommodation part to be formed later; forming a structure by forming an adhesion film on the sidewall, the structure being composed of the patterned layer and the adhesion film and having a second opening smaller than the first opening; and etching a portion of the etching mask material layer exposed from the second opening of the structure so that the etching mask material layer becomes the etching mask.

A near-field light generator manufactured by a manufacturing method of the present invention includes a waveguide and a plasmon generator. The waveguide includes a core through which light propagates, and a cladding provided around the core. The core has an upper surface. The plasmon generator is disposed above the upper surface of the core.

The plasmon generator includes a propagation part for propagating a surface plasmon that is excited based on the light propagating through the core. The propagation part has a lower surface, an upper surface opposite to the lower surface, a first side surface and a second side surface that are opposite to each other and connect the upper surface and the lower surface to each other, and a front end face that connects the upper surface, the lower surface, the first side surface and the second side surface to each other. The front end face includes a near-field light generating part that generates near-field light based on the surface plasmon.

The method of manufacturing the near-field light generator of the present invention includes the steps of: forming the waveguide; forming a dielectric layer on the upper surface of the core, the dielectric layer having an upper surface; forming an etching mask on the upper surface of the dielectric layer; etching the dielectric layer by using the etching mask and thereby forming in the dielectric layer an accommodation part for accommodating the plasmon generator; and forming the plasmon generator to be accommodated in the accommodation part.

The step of forming the etching mask includes the steps of; forming an etching mask material layer on the upper surface of the dielectric layer, the etching mask material layer having an upper surface; forming a patterned layer on the upper surface of the etching mask material layer by photolithography, the patterned layer having a first opening lying above the upper surface of the core, the first opening having a sidewall lying outside the outer edges of the planar shape of the accommodation part to be formed later; forming a structure by forming an adhesion film on the sidewall, the structure being composed of the patterned layer and the adhesion film and having a second opening smaller than the first opening; and etching a portion of the etching mask material layer exposed from the second opening of the structure so that the etching mask material layer becomes the etching mask.

In the method of manufacturing the plasmon generator and the method of manufacturing the near-field light generator of the present invention, the step of forming the structure includes the steps of; forming a deposition film to cover a portion of the upper surface of the etching mask material layer exposed from the first opening and the sidewall of the first opening; and etching a portion of the deposition film that lies on the upper surface of the etching mask material layer so that the deposition film becomes the adhesion film. In this case, the step of etching the portion of the deposition film may etch the portion of the deposition film such that an edge of the second opening located farthest from the upper surface of the etching mask material layer lies outwardly relative to an edge of the second opening located closest to the upper surface of the etching mask material layer.

The method of manufacturing the plasmon generator and the method of manufacturing the near-field light generator of the present invention may further include the step of removing the structure between the step of forming the etching mask and the step of forming the accommodation part.

Further, in the method of manufacturing the plasmon generator and the method of manufacturing the near-field light generator of the present invention, the etching mask may be formed of a metal. The patterned layer and the adhesion film may each be formed of a dielectric material.

Further, in the method of manufacturing the plasmon generator and the method of manufacturing the near-field light generator of the present invention, the step of forming the accommodation part may be performed by reactive ion etching.

In the method of manufacturing the plasmon generator and the method of manufacturing the near-field light generator of the present invention, an adhesion film is formed on the sidewall of the first opening of the patterned layer to thereby form the structure having the second opening smaller than the first opening. Then, the portion of the etching mask material layer exposed from the second opening is etched to form an etching mask. It is thereby possible to form an etching mask having an opening of a small width, irrespective of the limitations of photolithography. Using this etching mask, the dielectric layer is etched to form the accommodation part for accommodating the plasmon generator. The present invention thus makes it possible to manufacture a plasmon generator whose front end face including the near-field light generating part is small in width.

Other and further objects, features and advantages of the present invention will appear more fully from the following description.

DETAILED DESCRIPTION OF THE PREFERRED EMBODIMENT

Figure 2:
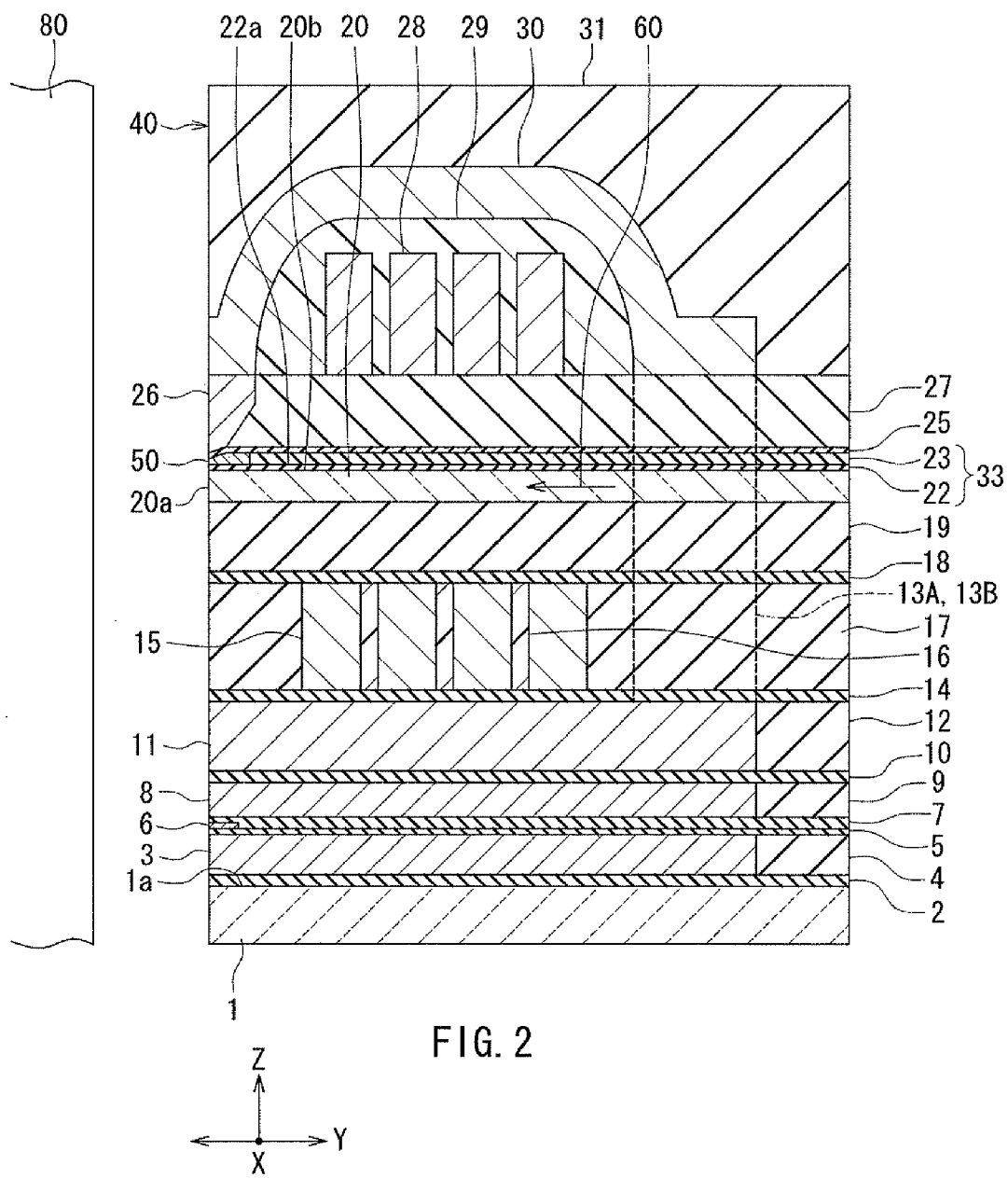
FIG. 2 is a cross-sectional view showing the configuration of a thermally-assisted magnetic recording head of the embodiment of the invention.
Figure 3:
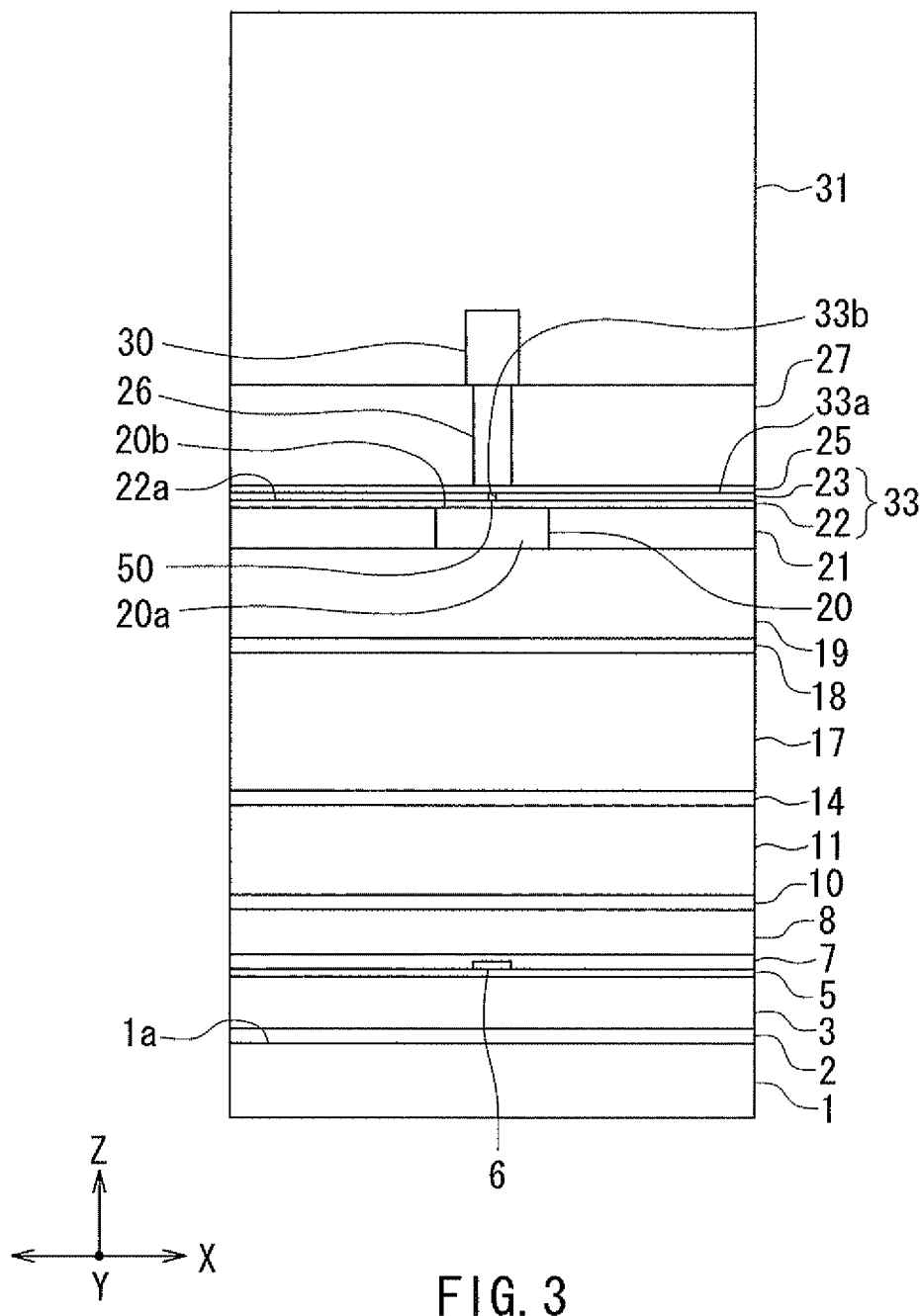
FIG. 3 is a front view showing the medium facing surface of the thermally-assisted magnetic recording head of the embodiment of the invention.

An embodiment of the present invention will now be described in detail with reference to the drawings. First, reference is made to FIG. 2 and FIG. 3 to describe the configuration of a thermally-assisted magnetic recording head of the embodiment of the invention. FIG. 2 is a cross-sectional view showing the configuration of the thermally-assisted magnetic recording head. FIG. 3 is a front view showing the medium facing surface of the thermally-assisted magnetic recording head.

The thermally-assisted magnetic recording head of the embodiment is for use in perpendicular magnetic recording, and is in the form of a slider to fly over the surface of a rotating recording medium. When the recording medium rotates, an airflow passing between the recording medium and the slider causes a lift to be exerted on the slider. The slider is configured to fly over the surface of the recording medium by means of the lift.

As shown in FIG. 2, the thermally-assisted magnetic recording head has a medium facing surface 40 facing a recording medium 80. Here, X direction, Y direction, and Z direction will be defined as follows. The X direction is the direction across the tracks of the recording medium 80, i.e., the track width direction. The Y direction is a direction perpendicular to the medium facing surface 40. The Z direction is the direction of travel of the recording medium 80 as viewed from the slider. The X, Y, and Z directions are orthogonal to one another.

As shown in FIG. 2 and FIG. 3, the thermally-assisted magnetic recording head includes: a substrate 1 formed of a ceramic material such as aluminum oxide-titanium carbide ($Al_2O_3$—TiC) and having an upper surface 1a; an insulating layer 2 formed of an insulating material and disposed on the upper surface 1a of the substrate 1; a bottom shield layer 3 formed of a magnetic material and disposed on the insulating layer 2; and an insulating layer 4 disposed on the insulating layer 2 and surrounding the bottom shield layer 3. The insulating layers 2 and 4 are formed of alumina ($Al_2O_3$), for example. The Z direction is also a direction perpendicular to the upper surface 1a of the substrate 1.

The thermally-assisted magnetic recording head further includes: a bottom shield gap film 5 which is an insulating film disposed over the upper surfaces of the bottom shield layer 3 and the insulating layer 4; a magnetoresistive (MR) element 6 serving as a read element disposed on the bottom shield gap film 5; two leads (not illustrated) connected to the MR element 6; and a top shield gap film 7 which is an insulating film disposed on the MR element 6.

An end of the MR element 6 is located in the medium facing surface 40. The MR element 6 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the planes of layers constituting the GMR element or the current-perpendicular-to-plane (CPP) type in which the current used for detecting magnetic signals is fed in a direction generally perpendicular to the planes of layers constituting the GMR element.

The thermally-assisted magnetic recording head further includes a top shield layer 8 formed of a magnetic material and disposed on the top shield gap film 7, and an insulating layer 9 disposed on the top shield gap film 7 and surrounding the top shield layer 8. The insulating layer 9 is formed of alumina, for example. The parts from the bottom shield layer 3 to the top shield layer 8 constitute a read head section.

The thermally-assisted magnetic recording head further includes a nonmagnetic layer 10 formed of a nonmagnetic material and disposed over the top shield layer 8 and the insulating layer 9, a return pole layer 11 formed of a magnetic material and disposed on the nonmagnetic layer 10, and an insulating layer 12 disposed on the nonmagnetic layer 10 and surrounding the return pole layer 11. The return pole layer 11 has an end face located in the medium facing surface 40. The nonmagnetic layer 10 and the insulating layer 12 are formed of alumina, for example.

The thermally-assisted magnetic recording head further includes two coupling portions 13A and 13B disposed away from the medium facing surface 40 and lying on part of the return pole layer 11, an insulating layer 14 disposed on another part of the return pole layer 11 and on the insulating layer 12, and a coil 15 disposed on the insulating layer 14. The coupling portions 13A and 13B are formed of a magnetic material. Each of the coupling portions 13A and 13B has a first layer located on the return pole layer 11, and a second, a third, and a fourth layer stacked in this order on the first layer. The first layer of the coupling portion 13A and the first layer of the coupling portion 13B are arranged to align in the track width direction (the X direction). The coil 15 is planar spiral-shaped and wound around the first layers of the coupling portions 13A and 13B. The coil 15 is formed of a conductive material such as copper. The insulating layer 14 is formed of alumina, for example.

The thermally-assisted magnetic recording head further includes an insulating layer 16 disposed in the space between every adjacent turns of the coil 15, an insulating layer 17 disposed around the coil 15, and an insulating layer 18 disposed over the coil 15 and the insulating layers 16 and 17. The insulating layer 16 is formed of photoresist, for example. The insulating layers 17 and 18 are formed of alumina, for example. The first layers of the coupling portions 13A and 13B are embedded in the insulating layers 14 and 17.

The thermally-assisted magnetic recording head further includes a waveguide including a core 20 and a cladding provided around the core 20. The core 20 has an end face 20a that is closer to the medium facing surface 40, and an upper surface 20b. The end face 20a may be located in the medium facing surface 40 or at a distance from the medium facing surface 40. FIG. 2 and FIG. 3 illustrate an example in which the end face 20a is located in the medium facing surface 40.

The cladding includes cladding layers 19 and 21, and a dielectric layer 22 having an upper surface 22a. The cladding layer 19 is disposed on the insulating layer 18. The core 20 is disposed on the cladding layer 19. The cladding layer 21 is disposed on the cladding layer 19 and surrounds the core 20. The upper surface 20b of the core 20 and the upper surface of the cladding layer 21 are even with each other. The dielectric layer 22 is disposed over the upper surface 20b of the core 20 and the upper surface of the cladding layer 21.

The core 20 is formed of a dielectric material that transmits laser light to be used for generating near-field light. The laser light emitted from a laser diode (not illustrated) enters the core 20 and propagates through the core 20. The cladding layers 19 and 21 and the dielectric layer 22 are each formed of a dielectric material that has a refractive index lower than that of the core 20. For example, the core 20 can be formed of tantalum oxide such as $Ta_2O_5$, or SiON. The cladding layers 19 and 21 and the dielectric layer 22 can be formed of alumina, $SiO_2$, or SiON.

The second layers of the coupling portions 13A and 13B are embedded in the insulating layer 18 and the cladding layer 19. The third layers of the coupling portions 13A and 13B are embedded in the cladding layer 21. The third layer of the coupling portion 13A and the third layer of the coupling portion 13B are located on opposite sides of the core 20 in the track width direction (the X direction) and are each spaced from the core 20.

The thermally-assisted magnetic recording head further includes a dielectric layer 23 disposed on the upper surface 22a of the dielectric layer 22. A combination of the dielectric layer 22 and the dielectric layer 23 corresponds to the "dielectric layer" according to the invention. The combination of the dielectric layer 22 and the dielectric layer 23 will hereinafter be referred to as the dielectric layer 33. As shown in FIG. 3, the dielectric layer 33 has an upper surface 33a, and an accommodation part 33b that opens in the upper surface 33a and is located above the upper surface 20b of the core 20. The upper surface 33a is formed of the upper surface of the dielectric layer 23. The accommodation part 33b has: a first sidewall and a second sidewall located near the medium facing surface 40 and spaced from each other by a predetermined distance in the track width direction (the X direction); a third sidewall connected to an end of the first sidewall farther from the medium facing surface 40; a fourth sidewall connected to an end of the second sidewall farther from the medium facing surface 40; and a bottom. The bottom of the accommodation part 33b is formed of part of the upper surface 22a of the dielectric layer 22. Each of the first and second sidewalls preferably forms an angle in the range of 0° to 15°, more preferably in the range of 0° to 10°, relative to a direction perpendicular to the upper surface 33a of the dielectric layer 33. The dielectric layer 23 can be formed of alumina, $SiO_2$, or SiON, for example.

The thermally-assisted magnetic recording head further includes a plasmon generator 50. The plasmon generator 50 is accommodated in the accommodation part 33b of the dielectric layer 33 such that the dielectric layer 22 is interposed between the plasmon generator 50 and the upper surface 20b of the core 20. The plasmon generator 50 is formed of a metal. More specifically, the plasmon generator 50 is formed of, for example, one of Au, Ag, Al, Cu, Pd, Pt, Rh and Ir, or an alloy composed of two or more of these elements. The shape of the plasmon generator 50A will be described in detail later.

The thermally-assisted magnetic recording head further includes: a dielectric layer 25 disposed on the plasmon generator 50 and the dielectric layer 23; a main pole 26 formed of a magnetic material and disposed on the dielectric layer 25 such that the plasmon generator 50 is interposed between the core 20 and the main pole 26; and a dielectric layer 27 disposed around the main pole 26. The fourth layers of the coupling portions 13A and 13B are embedded in the dielectric layers 22, 23, 25 and 27. The upper surfaces of the main pole 26, the dielectric layer 27, and the fourth layers of the coupling portions 13A and 13B are even with each other. The dielectric layer 25 is formed of alumina, for example. The dielectric layer 27 is formed of $SiO_2$, for example. The shape of the main pole 26 will be described in detail later.

The thermally-assisted magnetic recording head further includes a coil 28 disposed on the dielectric layer 27, an insulating layer 29 disposed to cover the coil 28, and a yoke layer 30 formed of a magnetic material and disposed over the main pole 26, the coupling portions 13A and 13B, the dielectric layer 27 and the insulating layer 29. The yoke layer 30 magnetically couples the main pole 26 to the coupling portions 13A and 13B. The coil 28 is planar spiral-shaped and wound around portions of the yoke layer 30 that lie on the coupling portions 13A and 13B. The coil 28 is formed of a conductive material such as copper. The insulating layer 29 is formed of photoresist, for example.

The thermally-assisted magnetic recording head further includes a protective layer 31 disposed to cover the yoke layer 30. The protective layer 31 is formed of alumina, for example.

The parts from the return pole layer 11 to the yoke layer 30 constitute a write head section. The coils 15 and 28 produce magnetic fields corresponding to data to be written on the recording medium 80. The return pole layer 11, the coupling portions 13A and 13B, the yoke layer 30, and the main pole 26 form a magnetic path for passing magnetic fluxes corresponding to the magnetic fields produced by the coils 15 and 28. The coils 15 and 28 are connected in series or in parallel so that the magnetic flux corresponding to the magnetic field produced by the coil 15 and the magnetic flux corresponding to the magnetic field produced by the coil 28 flow in the same direction through the main pole 26. The main pole 26 allows the magnetic flux corresponding to the magnetic field produced by the coil 15 and the magnetic flux corresponding to the magnetic field produced by the coil 28 to pass, and produces a write magnetic field for writing data on the recording medium 80 by means of a perpendicular magnetic recording system.

As has been described, the thermally-assisted magnetic recording head of the embodiment includes the medium facing surface 40, the read head section, and the write head section. The read head section and the write head section are stacked on the substrate 1. The write head section is located on the front side in the direction of travel of the recording medium 80 (the Z direction) (i.e., the trailing side) relative to the read head section.

The write head section includes the coils 15 and 28, the main pole 26, the waveguide, and the plasmon generator 50. The waveguide includes the core 20 through which light propagates, and the cladding provided around the core 20. In the embodiment, in particular, the core 20 allows laser light emitted from a non-illustrated laser diode to propagate through. The cladding includes the cladding layers 19 and 21 and the dielectric layer 22.

The core 20 has the upper surface 20b. The dielectric layer 22 has the upper surface 22a, and is disposed over the upper surface 20b of the core 20 and the upper surface of the cladding layer 21. The plasmon generator 50 is disposed above the upper surface 20b of the core 20 such that the dielectric layer 22 is interposed between the core 20 and the plasmon generator 50.

A near-field light generator according to the embodiment includes the wave guide having the core 20 and the cladding, and the plasmon generator 50.

Figure 1:
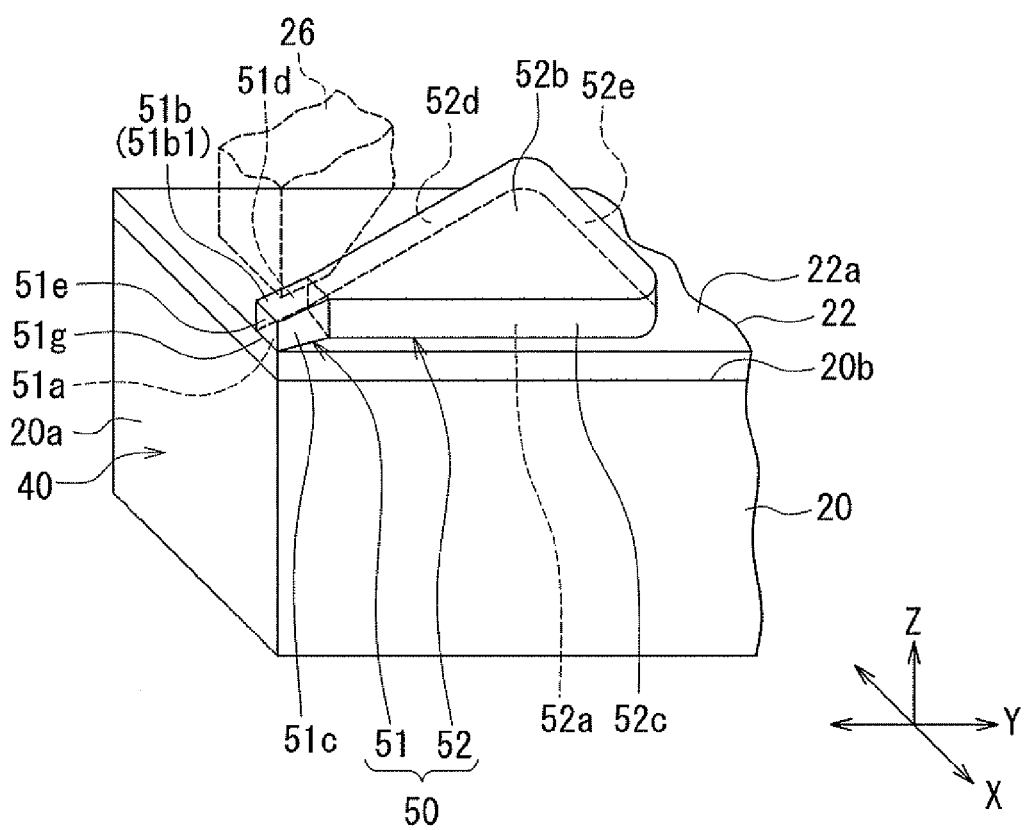
FIG. 1 is a perspective view showing the main part of a near-field light generator according to an embodiment of the invention.

Now, the shape of the plasmon generator 50 will be described in detail with reference to FIG. 1. FIG. 1 is a perspective view showing the main part of the near-field light generator. As shown in FIG. 1, the plasmon generator 50 includes a propagation part 51 located near the medium facing surface 40, and a width changing portion 52 that is located farther from the medium facing surface 40 than is the propagation part 51.

The propagation part 51 has: a lower surface 51a; an upper surface 51b opposite to the lower surface 51a; a first side surface 51c and a second side surface 51d opposite to each other and connecting the lower surface 51a and the upper surface 51b to each other; and a front end face 51e located in the medium facing surface 40 and connecting the lower surface 51a, the upper surface 51b, the first side surface 51c, and the second side surface 51d to each other.

The lower surface 51a is in contact with part of the bottom of the accommodation part 33b, i.e., part of the upper surface 22a of the dielectric layer 22. The lower surface 51a is parallel to the upper surface 1a of the substrate 1, and faces the upper surface 20b of the core 20 with a predetermined spacing therebetween. Although not illustrated, the first and second side surfaces 51c and 51d are in contact with the first and second sidewalls of the accommodation part 33b, respectively. The front end face 51e includes a near-field light generating part 51g that lies at an end of the lower surface 51a and generates near-field light based on surface plasmons, which will be described later.

The upper surface 51b includes an inclined portion 51b1. The distance from the lower surface 51a of the propagation part 51 to an arbitrary point on the inclined portion 51b1 decreases with decreasing distance from the arbitrary point to the front end face 51e. The upper surface 51b may include a flat portion that is located closer to or farther from the medium facing surface 40 than is the inclined portion 51b1 and contiguous with the inclined portion 51b1. The flat portion is parallel to the lower surface 51a.

A cross section of the propagation part 51 parallel to the medium facing surface 40 may be in the shape of a rectangle or a trapezoid with its upper base longer than its lower base. The width of the propagation part 51 in a direction parallel to the medium facing surface 40 and to the upper surface 1a of the substrate 1 (the X direction) may be constant regardless of the distance from the medium facing surface 40 or may decrease with increasing proximity to the medium facing surface 40. The width (the dimension in the track width direction (the X direction)) of the front end face 51e is defined by the width of the propagation part 51 in the medium facing surface 40. The width of the front end face 51e falls within the range of 5 to 40 nm, for example. The height (the dimension in the Z direction) of the front end face 51e is defined by the height of the propagation part 51 in the medium facing surface 40. The height of the front end face 51e falls within the range of 5 to 40 nm, for example.

The width changing portion 52 is located on a side of the propagation part 51 farther from the front end face 51e and is connected to the propagation part 51. The width changing portion 52 has: a lower surface 52a; an upper surface 52b opposite to the lower surface 52a; a first side surface 52c and a second side surface 52d opposite to each other and connecting the lower surface 52a and the upper surface 52b to each other; and a rear end face 52e connecting the lower surface 52a, the upper surface 52b, the first side surface 52c, and the second side surface 52d to each other.

The lower surface 52a is located farther from the medium facing surface 40 than is the lower surface 51a of the propagation part 51, and is contiguous with the lower surface 51a. The upper surface 52b is located farther from the medium facing surface 40 than is the upper surface 51b of the propagation part 51, and is contiguous with the upper surface 51b. The first side surface 52c is located farther from the medium facing surface 40 than is the first side surface 51c of the propagation part 51, and is contiguous with the first side surface 51c. The second side surface 52d is located farther from the medium facing surface 40 than is the second side surface 51d of the propagation part 51, and is contiguous with the second side surface 51d.

The lower surface 52a is in contact with another part of the bottom of the accommodation part 33b, i.e., another part of the upper surface 22a of the dielectric layer 22. Although not illustrated, the first and second side surfaces 52c and 52d are in contact with the third and fourth sidewalls of the accommodation part 33b, respectively.

A cross section of the width changing portion 52 parallel to the medium facing surface 40 may be in the shape of a rectangle or a trapezoid with its upper base longer than its lower base. The width changing portion 52 has a width in a direction parallel to the lower surface 51a and the front end face 51e of the propagation part 51 (the same direction as the direction parallel to the medium facing surface 40 and the upper surface 1a of the substrate 1). The width of the width changing portion 52 decreases with increasing proximity to the front end face 51e, and becomes equal to the width of the propagation part 51 at the boundary with the propagation part 51.

An example of the shape of the main pole 26 will now be described with reference to FIG. 1 and FIG. 2. The main pole 26 has a front end face located in the medium facing surface 40, and a rear end face opposite to the front end face. The main pole 26 further has a lower surface, an upper surface, and two side surfaces. Part of the lower surface of the main pole 26 is opposed to the inclined portion 51b1 of the upper surface 51b of the propagation part 51 with the dielectric layer 25 interposed therebetween. The distance from the upper surface 1a of the substrate 1 to an arbitrary point on the lower surface of the main pole 26 increases with increasing distance from the arbitrary point to the medium facing surface 40. Note that the shape of the main pole 26 is not limited to the foregoing example described with reference to FIG. 1 and FIG. 2.

Now, the principle of generation of near-field light in the embodiment and the principle of thermally-assisted magnetic recording using the near-field light will be described in detail. Laser light emitted from a non-illustrated laser diode enters the core 20. As shown in FIG. 2, the laser light 60 propagates through the core 20 toward the medium facing surface 40, and reaches the vicinity of the plasmon generator 50. The laser light 60 is then totally reflected at the upper surface 20b of the core 20. This generates evanescent light permeating into the dielectric layer 22. As a result, surface plasmons are excited at least on the lower surface 52a of the width changing portion 52 of the plasmon generator 50 through coupling with the evanescent light.

The surface plasmons excited on the lower surface 52a of the width changing portion 52 propagate through the lower surface 52a to reach the lower surface 51a of the propagation part 51, and further propagates through the lower surface 51a to reach the near-field light generating part 51g. Consequently, the surface plasmons concentrate at the near-field light generating part 51g, and the near-field light generating part 51g generates near-field light based on the surface plasmons. The near-field light is projected toward the recording medium 80, reaches the surface of the recording medium 80 and heats a part of the magnetic recording layer of the recording medium 80. This lowers the coercivity of the part of the magnetic recording layer. In thermally-assisted magnetic recording, the part of the magnetic recording layer with the lowered coercivity is subjected to a write magnetic field produced by the main pole 26 for data writing.

In the embodiment, the plasmon generator 50 has the propagation part 51 and the width changing portion 52. The embodiment allows a larger area of the lower surface of the plasmon generator 50 to be opposed to the upper surface 20b of the core 20 to allow more surface plasmons to be excited than in the case where the width changing portion 52 is not provided. Consequently, according to the embodiment, it is possible to generate near-field light of sufficient intensity.

Further, in the embodiment, since the upper surface 51b includes the inclined portion 51b1, it is possible to reduce the dimension of the front end face 51e in the Z direction while increasing the thickness of a portion of the plasmon generator 50 that is apart from the medium facing surface 40. Consequently, according to the embodiment, it is possible to generate near-field light having a small spot diameter and sufficient intensity.

A method of manufacturing the thermally-assisted magnetic recording head of the embodiment will now be described with reference to FIG. 2 and FIG. 3. The method of manufacturing the thermally-assisted magnetic recording head of the embodiment includes the steps of; forming components of a plurality of thermally-assisted magnetic recording heads other than the substrates 1 on a substrate that includes portions to become the substrates 1 of the plurality of thermally-assisted magnetic recording heads, thereby fabricating a substructure that includes rows of a plurality of pre-head portions that are to later become the plurality of thermally-assisted magnetic recording heads; and forming the plurality of thermally-assisted magnetic recording heads by cutting the substructure to separate the plurality of pre-head portions from each other. In the step of forming the plurality of thermally-assisted magnetic recording heads, the cut surfaces are polished into the medium facing surfaces 40.

The method of manufacturing the thermally-assisted magnetic recording head of the embodiment will now be described in more detail with attention focused on a single thermally-assisted magnetic recording head. In the method of manufacturing the thermally-assisted magnetic recording head of the embodiment, first, the insulating layer 2 is formed on the substrate 1. The bottom shield layer 3 is then formed on the insulating layer 2. Next, the insulating layer 4 is formed to cover the bottom shield layer 3. The insulating layer 4 is then polished by, for example, chemical mechanical polishing (hereinafter referred to as CMP), until the bottom shield layer 3 is exposed.

Next, the bottom shield gap film 5 is formed over the bottom shield layer 3 and the insulating layer 4. Next, the MR element 6 and non-illustrated two leads connected to the MR element 6 are formed on the bottom shield gap film 5. The top shield gap film 7 is then formed to cover the MR element 6 and the leads. The top shield layer 8 is then formed on the top shield gap film 7. Next, the insulating layer 9 is formed to cover the top shield layer 8. The insulating layer 9 is then polished by, for example, CMP, until the top shield layer 8 is exposed.

Next, the nonmagnetic layer 10 is formed over the top shield layer 8 and the insulating layer 9. The return pole layer 11 is then formed on the nonmagnetic layer 10. Next, the insulating layer 12 is formed to cover the return pole layer 11. The insulating layer 12 is then polished by, for example, CMP, until the return pole layer 11 is exposed. Next, the insulating layer 14 is formed over the return pole layer 11 and the insulating layer 12.

The insulating layer 14 is then selectively etched to form therein two openings for exposing the upper surface of the return pole layer 11. Next, the first layers of the coupling portions 13A and 13B are formed on the return pole layer 11 at the positions of the two openings. Next, the coil 15 is formed on the insulating layer 14. The insulating layer 16 is then formed in the space between every adjacent turns of the coil 15. Next, the insulating layer 17 is formed over the entire upper surface of the stack. The insulating layer 17 is then polished by, for example, CMP, until the first layers of the coupling portions 13A and 13B, the coil 15, and the insulating layer 16 are exposed. The upper surfaces of the first layers of the coupling portions 13A and 13B, the coil 15, and the insulating layers 16 and 17 are thereby made even with each other. Next, the insulating layer 18 is formed over the first layers of the coupling portions 13A and 13B, the coil 15, and the insulating layers 16 and 17.

The insulating layer 18 is then selectively etched to form therein two openings for exposing the upper surfaces of the first layers of the coupling portions 13A and 13B. Next, the second layers of the coupling portions 13A and 13B are formed on the first layers of the coupling portions 13A and 13B. Next, the cladding layer 19 is formed to cover the second layers of the coupling portions 13A and 13B. The cladding layer 19 is then polished by, for example, CMP, until the second layers of the coupling portions 13A and 13B are exposed.

Next, the third layers of the coupling portions 13A and 13B are formed on the second layers of the coupling portions 13A and 13B. The core 20 is then formed on the cladding layer 19. Next, the cladding layer 21 is formed over the entire upper surface of the stack. The cladding layer 21 is then polished by, for example, CMP, until the third layers of the coupling portions 13A and 13B and the core 20 are exposed. The upper surfaces of the third layers of the coupling portions 13A and 13B, the core 20, and the cladding layer 21 are thereby made even with each other. Next, the dielectric layer 22 is formed over the third layers of the coupling portions 13A and 13B, the core 20, and the cladding layer 21. The dielectric layer 23 and the plasmon generator 50 are then formed on the dielectric layer 22. The process of forming the dielectric layer 23 and the plasmon generator 50 will be described in detail later.

Next, the dielectric layer 25 is formed on the dielectric layer 23 and the plasmon generator 50. The dielectric layers 22, 23, and 25 are then selectively etched to form therein openings for exposing the upper surfaces of the third layers of the coupling portions 13A and 13B. The fourth layers of the coupling portions 13A and 13B are then formed on the third layers of the coupling portions 13A and 13B. Next, the dielectric layer 27 is formed to cover the fourth layers of the coupling portions 13A and 13B. The dielectric layer 27 is then polished by, for example, CMP, until the fourth layers of the coupling portions 13A and 13B are exposed.

Next, the dielectric layer 27 is taper-etched by, for example, reactive ion etching (hereinafter referred to as RIE) or ion beam etching (hereinafter referred to as IBE) to provide the dielectric layer 27 with an accommodation part for accommodating the main pole 26. The main pole 26 is then formed in the accommodation part of the dielectric layer 27. Next, the coil 28 is formed on the dielectric layer 27. The insulating layer 29 is then formed to cover the coil 28. Next, the yoke layer 30 is formed over the main pole 26, the fourth layers of the coupling portions 13A and 13B, the dielectric layer 27, and the insulating layer 29. Next, the protective layer 31 is formed to cover the yoke layer 30. Wiring, terminals, and other components are then formed on the upper surface of the protective layer 31.

When the substructure is completed thus, the substructure is cut to separate the plurality of pre-head portions from each other, followed by the polishing of the medium facing surface 40 and the fabrication of flying rails etc. The thermally-assisted magnetic recording head is thereby completed.

Now, a method of manufacturing the near-field light generator according to the embodiment will be described. The method of manufacturing the near-field light generator according to the embodiment includes the steps of; forming the waveguide; forming the dielectric layer 33; and forming the plasmon generator 50. The step of forming the waveguide includes the steps of forming the cladding layer 19, forming the core 20, forming the cladding layer 21, and forming the dielectric layer 22.

Reference is now made to FIG. 4 to FIG. 12 to describe the steps in which the plasmon generator 50 is formed after the formation of the dielectric layer 22. The following description includes the description of the method of manufacturing the plasmon generator 50 according to the embodiment. FIG. 4 to FIG. 12 each show a cross section of a stack of layers formed in the process of manufacturing the near-field light generator, the cross section being taken in the position where the medium facing surface 40 is to be formed.

Figure 4:
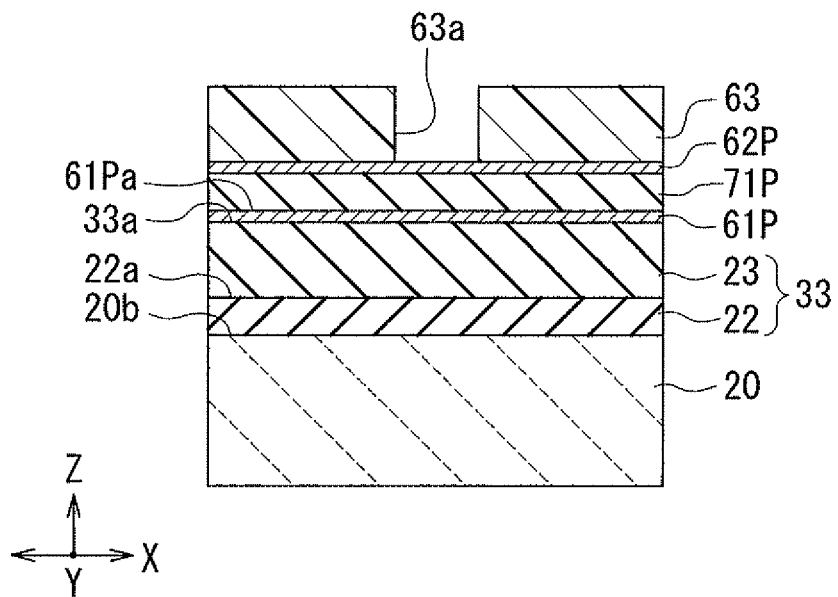
FIG. 4 is a cross-sectional view showing a step of a method of manufacturing the near-field light generator according to the embodiment of the invention.

FIG. 4 shows a step that follows the formation of the dielectric layer 22. In this step, first, the dielectric layer 23 is formed on the upper surface 22a of the dielectric layer 22. The dielectric layer 33, which is a combination of the dielectric layer 22 and the dielectric layer 23, is thereby formed. The dielectric layer 33 has the upper surface 33a. Next, an etching mask material layer 61P having an upper surface 61Pa is formed on the upper surface 33a of the dielectric layer 33. For example, the etching mask material layer 61P is formed of a metal such as Ru.

Next, a patterned layer is formed on the upper surface 61Pa of the etching mask material layer 61P by photolithography. This step will now be described with reference to FIG. 4 and FIG. 5. First, as shown in FIG. 4, an initial layer 71P is formed on the upper surface 61Pa of the etching mask material layer 61P. The initial layer 71P is formed of a dielectric material, for example. The dielectric material employed to form the initial layer 71P may be alumina, for example. Next, a mask material layer 62P is formed on the initial layer 71P. The material of the mask material layer 62P is a metal such as Ru, for example. Next, a photoresist mask 63 having an opening 63a is formed on the mask material layer 62P. The photoresist mask 63 is formed by patterning a photoresist layer by photolithography. The opening 63a of the photoresist mask 63 is shaped to be similar to but larger than the planar shape (the shape in a plan view) of the accommodation part 33b to be formed later. More specifically, the opening 63a has a sidewall lying outside the outer edges of the planar shape of the accommodation part 33b.

Figure 5:
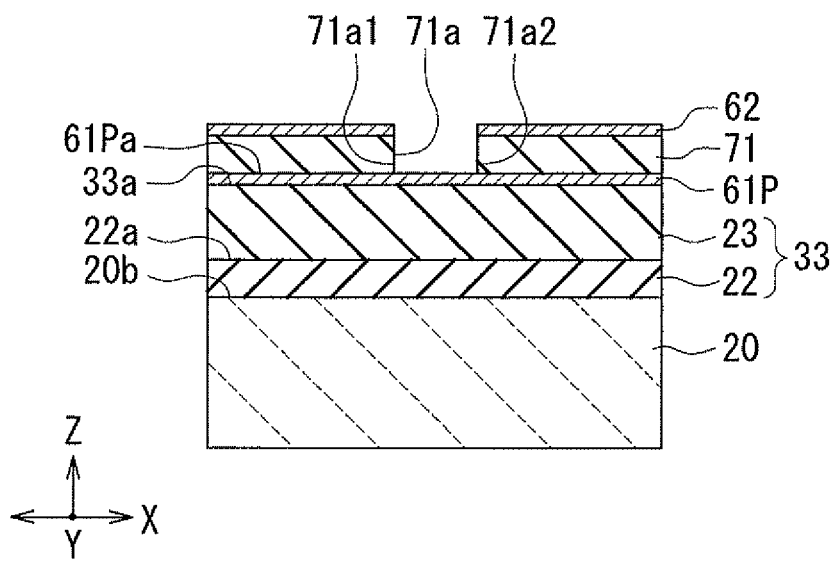
FIG. 5 is a cross-sectional view showing a step that follows the step shown in FIG. 4.

FIG. 5 shows the next step. In this step, first, a portion of the mask material layer 62P that is exposed from the opening 63a of the photoresist mask 63 is etched away by, for example, IBE, using the photoresist mask 63 as the etching mask. This makes the mask material layer 62P into a mask 62. The photoresist mask 63 is then removed. Using the mask 62, a portion of the initial layer 71P is then etched away by, for example, RIE, so that a portion of the upper surface 61Pa of the etching mask material layer 61P is exposed. This provides the initial layer 71P with a first opening 71a, thereby making the initial layer 71P into a patterned layer 71. Where the initial layer 71P is formed of alumina, a gas containing $Cl_2$ and $BCl_3$, for example, is used as the etching gas to etch the initial layer 71P by RIE.

The first opening 71a of the patterned layer 71 is shaped to be similar to but larger than the planar shape of the accommodation part 33b to be formed later. More specifically, the opening 71a has a sidewall lying outside the outer edges of the planar shape of the accommodation part 33b. In the embodiment, the sidewall of the first opening 71a includes a first sidewall portion 71a1 and a second sidewall portion 71a2 spaced from each other by a predetermined distance in the track width direction (the X direction), a third sidewall portion (not illustrated) coupled to an end of the first sidewall portion 71a1 farther from the position at which the medium facing surface 40 is to be formed, and a fourth sidewall portion (not illustrated) coupled to an end of the second sidewall portion 71a2 farther from the position at which the medium facing surface 40 is to be formed.

The first sidewall portion 71a1 has a shape similar to the first sidewall of the accommodation part 33b and the first side surface 51c of the propagation part 51 of the plasmon generator 50. The second sidewall portion 71a2 has a shape similar to the second sidewall of the accommodation part 33b and the second side surface 51d of the propagation part 51 of the plasmon generator 50. The third sidewall portion has a shape similar to the third sidewall of the accommodation part 33b and the first side surface 52c of the width changing portion 52 of the plasmon generator 50. The fourth sidewall portion has a shape similar to the fourth sidewall of the accommodation part 33b and the second side surface 52d of the width changing portion 52 of the plasmon generator 50.

Figure 6:
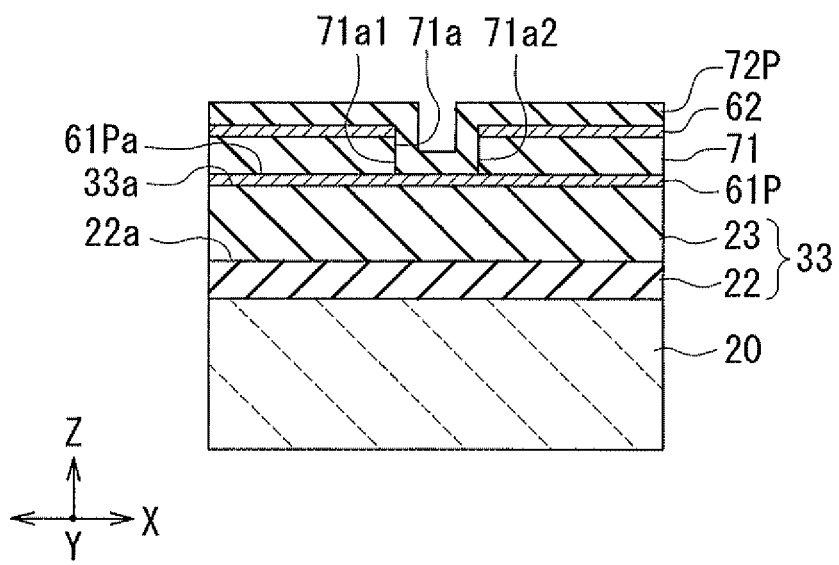
FIG. 6 is a cross-sectional view showing a step that follows the step shown in FIG. 5.

Next, an adhesion film is formed on the sidewall of the first opening 71a to form a structure having a second opening smaller than the first opening 71a. This step will now be described with reference to FIG. 6 and FIG. 7. First, as shown in FIG. 6, a deposition film 72P is formed to cover a portion of the upper surface 61Pa of the etching mask material layer 61P exposed from the first opening 71a and the sidewall of the first opening 71a. The deposition film 72P is formed also on the upper surface of the mask 62. The deposition film 72P is formed of a dielectric material, for example. The dielectric material employed to form the deposition film 72P may be alumina, for example. Where alumina is employed as the material of the deposition film 72P, the deposition film 72P is formed by atomic layer deposition (ALD) or chemical vapor deposition (CVD), for example.

Figure 7:
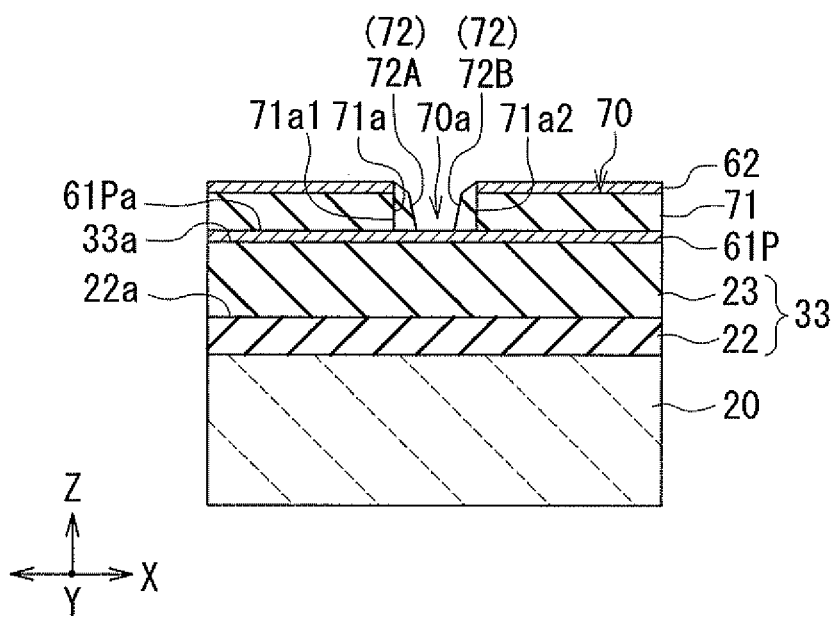
FIG. 7 is a cross-sectional view showing a step that follows the step shown in FIG. 6.

FIG. 7 shows the next step. In this step, a portion of the deposition film 72P lying on the upper surface 61Pa of the etching mask material layer 61P is etched by, for example, RIE, so that the deposition film 72P becomes the adhesion film 72. At this time, another portion of the deposition film 72P lying on the upper surface of the mask 62 is also etched simultaneously. The remainder of the deposition film 72P after this etching becomes the adhesion film 72 adhering to the sidewall of the first opening 71a. As a result, there is formed a structure 70 composed of the patterned layer 71 and the adhesion film 72. The adhesion film 72 includes a first portion 72A adhering to the first sidewall portion 71a1 of the first opening 71a, a second portion 72B adhering to the second sidewall portion 71a2 of the first opening 71a, and two portions (not illustrated) adhering to the third and fourth sidewall portions of the first opening 71a.

The structure 70 has a second opening 70a smaller than the first opening 71a. An edge of the second opening 70a located closest to the upper surface 61Pa of the etching mask material layer 61P defines the planar shape of the accommodation part 33b to be formed later.

In the embodiment, in particular, the step of etching the portion of the deposition film 72P etches the portion of the deposition film 72P such that a first edge of the second opening 70a located farthest from the upper surface 61Pa of the etching mask material layer 61P lies outwardly relative to a second edge of the second opening 70a located closest to the upper surface 61Pa of the etching mask material layer 61P. As a result of this etching, the shape of the second opening 70a in a cross section parallel to the upper surface 61Pa of the etching mask material layer 61P becomes larger with increasing distance between the aforementioned cross section and the upper surface 61Pa. Further, a first distance or the distance between the first portion 72A and the second portion 72B at the position farthest from the upper surface 61Pa of the etching mask material layer 61P becomes greater than a second distance or the distance between the first portion 72A and the second portion 72B at the position closest to the upper surface 61Pa of the etching mask material layer 61P. In this case, the second distance defines the minimum width of the second opening 70a.

Figure 8:
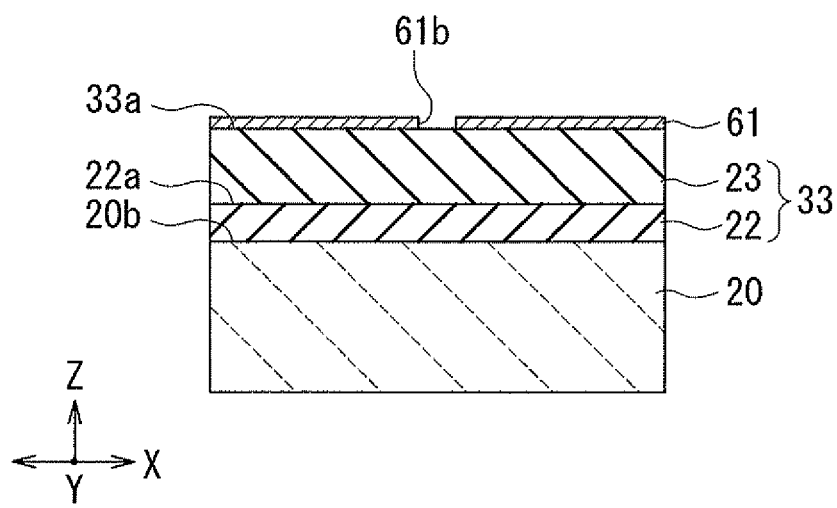
FIG. 8 is a cross-sectional view showing a step that follows the step shown in FIG. 7.

FIG. 8 shows the next step. In this step, first, a portion of the etching mask material layer 61P that is exposed from the second opening 70a of the structure 70 is etched away by IBE or RIE, for example. This provides the etching mask material layer 61P with an opening 61b having a shape corresponding to the planar shape of the accommodation part 33b to be formed later, and thereby makes the etching mask material layer 61P into an etching mask 61. The etching mask 61 is made of the material of the etching mask material layer 61P, that is, a metal such as Ru, for example.

Where the second opening 70a is shaped such that the first edge lies outwardly relative to the second edge as mentioned above, there is the following benefit in the step of etching the etching mask material layer 61P. Specifically, in the case of etching the etching mask material layer 61P by IBE, ion beams are more likely to reach the upper surface 61Pa of the etching mask material layer 61P. In the case of etching the etching mask material layer 61P by RIE, ions and the etching gas are more likely to reach the upper surface 61Pa of the etching mask material layer 61P.

Next, the mask 62 and the structure 70 are removed. Where the patterned layer 71 and the adhesion film 72 constituting the structure 70 are formed of alumina, the structure 70 is removed by wet etching, for example.

Figure 9:
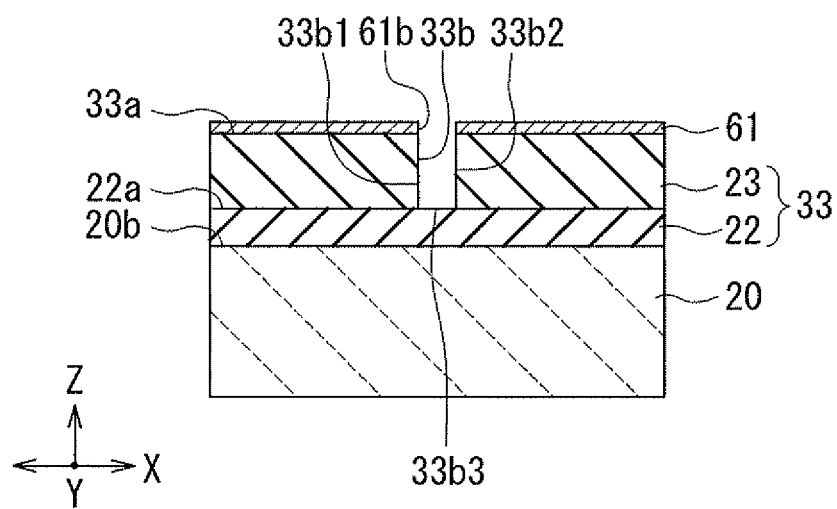
FIG. 9 is a cross-sectional view showing a step that follows the step shown in FIG. 8.

FIG. 9 shows the next step. In this step, first, the dielectric layer 33 is etched using the etching mask 61 by, for example, RIE to thereby form in the dielectric layer 33 the accommodation part 33b which opens in the top surface 33a. Of the dielectric layers 22 and 23 constituting the dielectric layer 33, only the dielectric layer 23 is etched in this step, in particular. In FIG. 9, the symbol 33b1 represents the first sidewall of the accommodation part 33b, the symbol 33b2 represents the second sidewall of the accommodation part 33b, and the symbol 33b3 represents the bottom of the accommodation part 33b. The bottom 33b3 is formed of part of the upper surface 22a of the dielectric layer 22. The etching mask 61 is then removed.

Figure 10:
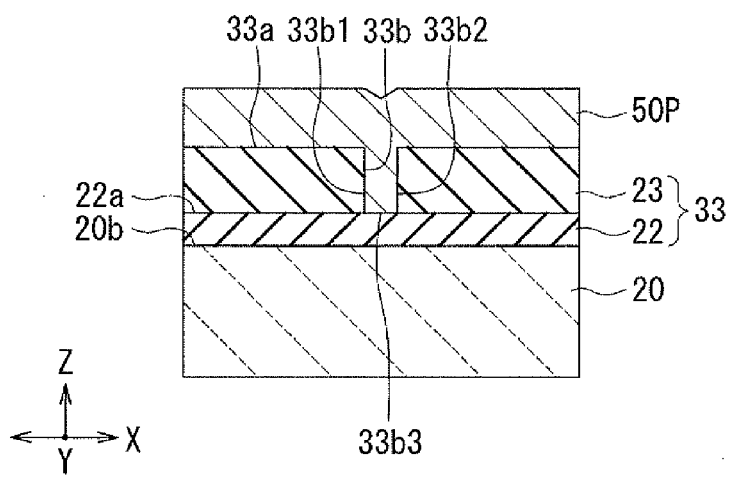
FIG. 10 is a cross-sectional view showing a step that follows the step shown in FIG. 9.

FIG. 10 shows the next step. In this step, a metal film 50P, which is to later become the plasmon generator 50, is formed to fill the accommodation part 33b. As shown in FIG. 10, the metal film 50P is formed also on the upper surface 33a of the dielectric layer 33.

Figure 11:
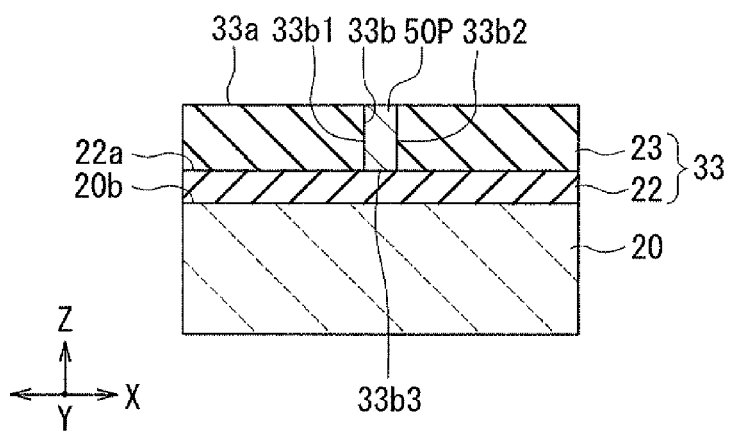
FIG. 11 is a cross-sectional view showing a step that follows the step shown in FIG. 10.

FIG. 11 shows the next step. In this step, the metal film 50P is polished by, for example, CMP, so that a portion of the metal film 50P lying on the upper surface 33a of the dielectric layer 33 is removed. This polishing may be terminated when the upper surface 33a of the dielectric layer 33 is exposed. This allows the metal film 50P to have the same thickness as the dielectric layer 23.

Figure 12:
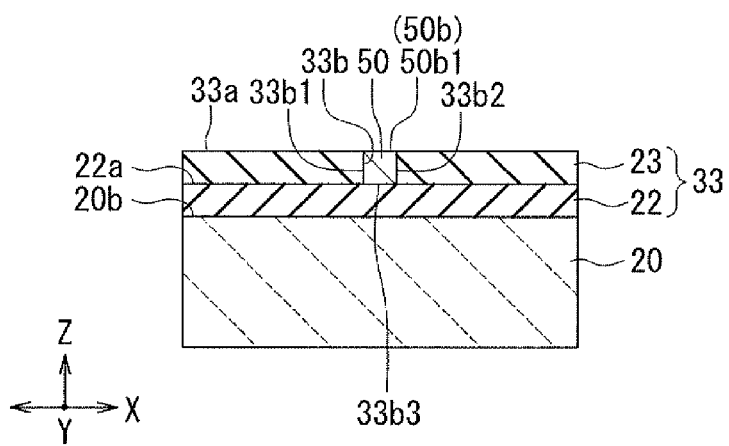
FIG. 12 is a cross-sectional view showing a step that follows the step shown in FIG. 11.

FIG. 12 shows the next step. In this step, respective portions of the polished dielectric layer 33 and metal film 50P that are apart from the bottom 33b3 of the accommodation part 33b are etched away so as to provide the upper surface of the polished metal film 50P with the inclined portion 51b1. This etching is performed in the following manner, for example. First, a photoresist mask is formed to cover at least a portion of the upper surface of the polished metal film 50P, the portion being intended to later become the upper surface 52b (see FIG. 1) of the width changing portion 52. This photoresist mask is formed by patterning a photoresist layer by photolithography. Then, using the photoresist mask as an etching mask, respective portions of the polished dielectric layer 33 and metal film 50P that are apart from the bottom 33b3 of the accommodation part 33b and not covered by the photoresist mask are taper-etched. The inclined portion 51b1 is thereby formed. The photoresist mask is then removed. The plasmon generator 50 is completed through a series of steps described above.

As has been described, the method of manufacturing the near-field light generator and the method of manufacturing the plasmon generator 50 according to the embodiment each include the steps of: forming the dielectric layer 33 (the dielectric layers 22 and 23) having the upper surface 33a; forming the etching mask 61 on the upper surface 33a of the dielectric layer 33; forming the accommodation part 33b in the dielectric layer 33 by etching the dielectric layer 33 using the etching mask 61; and forming the plasmon generator 50 to be accommodated in the accommodation part 33b.

The step of forming the etching mask 61 includes the steps of: forming the etching mask material layer 61P having the upper surface 61Pa on the upper surface 33a of the dielectric layer 33; and forming the patterned layer 71 having the first opening 71a on the upper surface 61Pa of the etching mask material layer 61P by photolithography. The first opening 71a has the sidewall (the first sidewall portion 71a1, the second sidewall portion 71a2, the third sidewall portion and the fourth sidewall portion) lying outside the outer edges of the planar shape of the accommodation part 33b to be formed later. The step of forming the etching mask 61 further includes the steps of: forming the structure 70 by forming the adhesion film 72 on the sidewall, the structure 70 being composed of the patterned layer 71 and the adhesion film 72 and having the second opening 70a smaller than the first opening 71a; and etching the portion of the etching mask material layer 61P exposed from the second opening 70a of the structure 70 so that the etching mask material layer 61P becomes the etching mask 61.

In the embodiment, the first opening 71a of the patterned layer 71 is defined by photolithography. The structure 70 produced by forming the adhesion film 72 on the sidewall of the first opening 71a has the second opening 70a smaller than the first opening 71a. The distance between the first sidewall portion 71a1 and the second sidewall portion 71a2, that is, the minimum width of the first opening 71a, depends on the limitations of photolithography. On the other hand, the distance (the second distance) between the first portion 72A and the second portion 72B of the adhesion film 72, that is, the minimum width of the second opening 70a, is made smaller than the distance between the first sidewall portion 71a1 and the second sidewall portion 71a2 irrespective of the limitations of photolithography.

In the embodiment, the portion of the etching mask material layer 61P exposed from the second opening 70a is etched to form the etching mask 61. It is thus possible to form the etching mask 61 having the opening 61b of small width irrespective of the limitations of photolithography. Using this etching mask 61, the dielectric layer 33 is etched to form the accommodation part 33b for accommodating the plasmon generator 50. The distance between the first sidewall 33b1 and the second sidewall 33b2, that is, the minimum width of the accommodation part 33b, is smaller than the distance between the first sidewall portion 71a1 and the second sidewall portion 71a2 of the sidewall of the first opening 71a. Consequently, according to the embodiment, it is possible to manufacture the plasmon generator 50 whose front end face 51e including the near-field light generating part 51g is small in width, irrespective of the limitations of photolithography.

Further, in the embodiment, the step of forming the accommodation part 33b is performed by RIE, for example. In this step, variations in width of the accommodation part 33, particularly in the vicinity of the bottom 33b3, can be reduced by etching the dielectric layer 33 in a direction perpendicular to the upper surface 33a thereof. According to the embodiment, it is thereby possible to manufacture with stability the plasmon generator 50 whose front end face 51e is small in width, as mentioned above.

Figure 13:
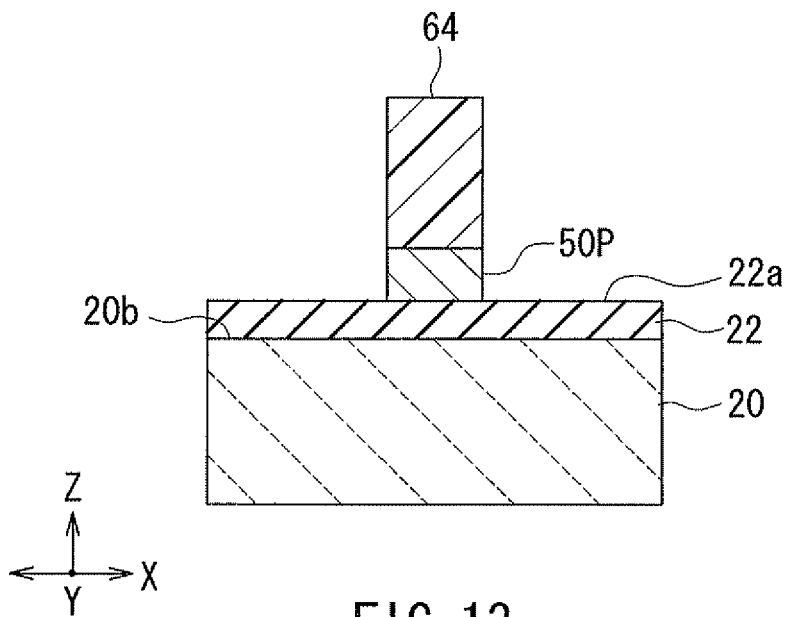
FIG. 13 is a cross-sectional view showing a step of a method of manufacturing a near-field light generator of a first comparative example.

The effects of the embodiment will now be described in more detail in comparison with methods of manufacturing near-field light generators of first and second comparative examples. First, reference is made to FIG. 13 to describe a method of manufacturing a near-field light generator of the first comparative example. FIG. 13 is a cross-sectional view showing a step of the method of manufacturing the near-field light generator of the first comparative example. FIG. 13 shows a cross section of a stack of layers formed in the process of manufacturing the near-field light generator, the cross section being taken in the position where the medium facing surface 40 is to be formed.

In the first comparative example, the dielectric layer 22 is formed and then the metal film 50P to later become the plasmon generator 50 is formed on the upper surface 22a of the dielectric layer 22. Next, an etching mask 64, whose planar shape corresponds to the planar shape of the plasmon generator 50, is formed on the metal film 50P. The etching mask 64 is formed by patterning a photoresist layer by photolithography. Using the etching mask 64, the metal film 50P except the portion thereof lying under the etching mask 64 is then removed by IBE, for example.

According to the first comparative example, it is difficult to reduce the width of the etching mask 64 due to the limitations of photolithography, and consequently, it is difficult to reduce the width of the front end face 51e of the plasmon generator 50 to 40 nm or smaller. In the first comparative example, the metal film 50P can be etched with the direction of travel of the ion beams tilted relative to a direction perpendicular to the upper surface 22a of the dielectric layer 22, for example. However, in the first comparative example, even if the width of the front end face 51e of the plasmon generator 50 could be reduced to 40 nm or smaller by etching the metal film 50P in the above-described manner, nothing to support the plasmon generator 50 exists around the plasmon generator 50, and consequently there arises a problem that part of the plasmon generator 50 is susceptible to being stripped off from the underlying layer or the dielectric layer 22.

In contrast to this, according to the embodiment, although the distance between the first sidewall portion 71a1 and the second sidewall portion 71a2 or the minimum width of the first opening 71a depends on the limitations of photolithography, the minimum width of the second opening 70a of the structure 70 can be reduced to 40 nm or smaller irrespective of the limitations of photolithography. The embodiment thus allows the width of the front end face 51e of the plasmon generator 50 to be reduced to 40 nm or smaller. Further, according to the embodiment, since the plasmon generator 50 is formed while being supported by the accommodation part 33b, no part of the plasmon generator 50 would be stripped off from the dielectric layer 22 even if the width of the front end face 51e of the plasmon generator 50 is reduced to 40 nm or smaller.

Figure 14:
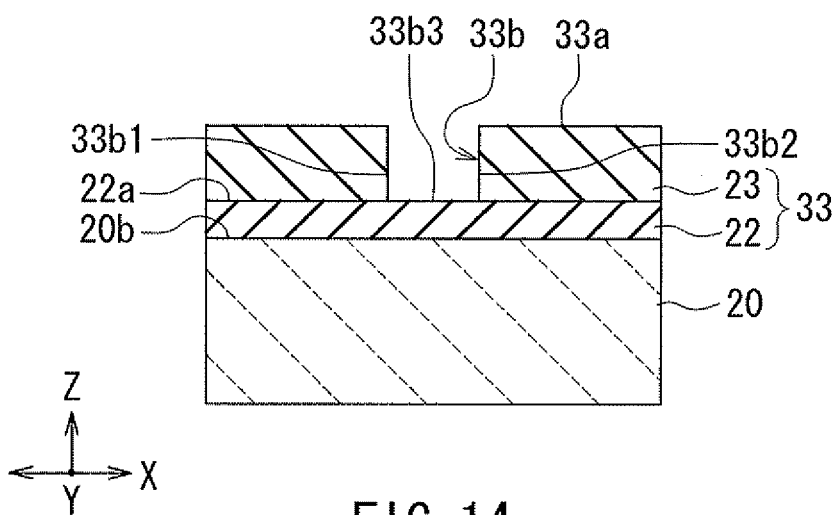
FIG. 14 is a cross-sectional view showing a step of a method of manufacturing a near-field light generator of a second comparative example.

Reference is now made to FIG. 14 to describe a method of manufacturing a near-field light generator of the second comparative example. FIG. 14 is a cross-sectional view showing a step of the method of manufacturing the near-field light generator of the second comparative example. FIG. 14 shows a cross section of a stack of layers formed in the process of manufacturing the near-field light generator, the cross section being taken in the position where the medium facing surface 40 is to be formed.

In the second comparative example, the dielectric layer 33 is formed and then the accommodation part 33b is formed in the dielectric layer 33 by photolithography. Thereafter, the metal film 50 to later become the plasmon generator 50 is formed to fill at least part of the accommodation part 33b. According to the second comparative example, it is difficult to reduce the distance between the first sidewall 33b1 and the second sidewall 33b2 or the minimum width of the accommodation part 33b due to the limitations of photolithography, and consequently, it is difficult to reduce the width of the front end face 51e of the plasmon generator 50 to 40 nm or smaller.

In contrast to this, according to the embodiment, it is possible to reduce the width of the front end face 51e of the plasmon generator 50 to 40 nm or smaller irrespective of the limitations of photolithography, as mentioned above.

The present invention is not limited to the foregoing embodiment, and various modifications may be made thereto. For example, in the present invention, the step shown in FIG. 12 may be omitted and the metal film 50P having undergone the polishing step of FIG. 11 may serve as the plasmon generator 50.

Further, as far as the requirements of the appended claims are met, the shape of the plasmon generator 50 except the propagation part 51 may be arbitrarily chosen without being limited to the example illustrated in the foregoing embodiment.

It is apparent that the present invention can be carried out in various forms and modifications in the light of the foregoing descriptions. Accordingly, within the scope of the following claims and equivalents thereof, the present invention can be carried out in forms other than the foregoing most preferable embodiment.

What is claimed is:
1. A method of manufacturing a plasmon generator, the plasmon generator including a propagation part for propagat- ing a surface plasmon that is excited based on light, the propagation part having a lower surface, an upper surface opposite to the lower surface, a first side surface and a second side surface that are opposite to each other and connect the upper surface and the lower surface to each other, and a front end face that connects the upper surface, the lower surface, the first side surface and the second side surface to each other, the front end face including a near-field light generating part that generates near-field light based on the surface plasmon, the method comprising the steps of:

forming a dielectric layer having an upper surface;

forming an etching mask on the upper surface of the dielectric layer;

etching the dielectric layer by using the etching mask and thereby forming in the dielectric layer an accommodation part for accommodating the plasmon generator; and forming the plasmon generator to be accommodated in the accommodation part, wherein the step of forming the etching mask includes the steps of:

forming an etching mask material layer on the upper surface of the dielectric layer, the etching mask material layer having an upper surface;

forming a patterned layer on the upper surface of the etching mask material layer by photolithography, the patterned layer having a first opening, the first opening having a sidewall lying outside outer edges of a planar shape of the accommodation part to be formed later;

forming a structure by forming an adhesion film on the sidewall, the structure being composed of the patterned layer and the adhesion film and having a second opening smaller than the first opening; and etching a portion of the etching mask material layer exposed from the second opening of the structure so that the etching mask material layer becomes the etching mask.

2. The method of manufacturing the plasmon generator according to claim 1, wherein the step of forming the structure includes the steps of: forming a deposition film to cover a portion of the upper surface of the etching mask material layer exposed from the first opening and the sidewall of the first opening; and etching a portion of the deposition film that lies on the upper surface of the etching mask material layer so that the deposition film becomes the adhesion film.

3. The method of manufacturing the plasmon generator according to claim 2, wherein the step of etching the portion of the deposition film etches the portion of the deposition film such that an edge of the second opening located farthest from the upper surface of the etching mask material layer lies outwardly relative to an edge of the second opening located closest to the upper surface of the etching mask material layer.

4. The method of manufacturing the plasmon generator according to claim 1, further comprising the step of removing the structure between the step of forming the etching mask and the step of forming the accommodation part.

5. The method of manufacturing the plasmon generator according to claim 1, wherein the etching mask is formed of a metal.

6. The method of manufacturing the plasmon generator according to claim 1, wherein the patterned layer and the adhesion film are each formed of a dielectric material.

7. The method of manufacturing the plasmon generator according to claim 1, wherein the step of forming the accommodation part is performed by reactive ion etching.

8. A method of manufacturing a near-field light generator, the near-field light generator including a waveguide and a plasmon generator, wherein the waveguide includes a core through which light propagates, and a cladding provided around the core, the core has an upper surface, the plasmon generator is disposed above the upper surface of the core, and the plasmon generator includes a propagation part for propagating a surface plasmon that is excited based on the light propagating through the core, the propagation part having a lower surface, an upper surface opposite to the lower surface, a first side surface and a second side surface that are opposite to each other and connect the upper surface and the lower surface to each other, and a front end face that connects the upper surface, the lower surface, the first side surface and the second side surface to each other, the front end face including a near-field light generating part that generates near-field light based on the surface plasmon, the method comprising the steps of:

forming the waveguide;

forming a dielectric layer on the upper surface of the core, the dielectric layer having an upper surface;

forming an etching mask on the upper surface of the dielectric layer;

etching the dielectric layer by using the etching mask and thereby forming in the dielectric layer an accommodation part for accommodating the plasmon generator; and forming the plasmon generator to be accommodated in the accommodation part, wherein step of forming the etching mask includes the steps of;

forming an etching mask material layer on the upper surface of the dielectric layer, the etching mask material layer having an upper surface;

forming a patterned layer on the upper surface of the etching mask material layer by photolithography, the patterned layer having a first opening lying above the upper surface of the core, the first opening having a sidewall lying outside outer edges of a planar shape of the accommodation part to be formed later;

forming a structure by forming an adhesion film on the sidewall, the structure being composed of the patterned layer and the adhesion film and having a second opening smaller than the first opening; and etching a portion of the etching mask material layer exposed from the second opening of the structure so that the etching mask material layer becomes the etching mask.

9. The method of manufacturing the near-field light generator according to claim 8, wherein the step of forming the structure includes the steps of: forming a deposition film to cover a portion of the upper surface of the etching mask material layer exposed from the first opening and the sidewall of the first opening; and etching a portion of the deposition film that lies on the upper surface of the etching mask material layer so that the deposition film becomes the adhesion film.

10. The method of manufacturing the near-field light generator according to claim 9, wherein the step of etching the portion of the deposition film etches the portion of the deposition film such that an edge of the second opening located farthest from the upper surface of the etching mask material layer lies outwardly relative to an edge of the second opening located closest to the upper surface of the etching mask material layer.

11. The method of manufacturing the near-field light generator according to claim 8, further comprising the step of removing the structure between the step of forming the etching mask and the step of forming the accommodation part.

12. The method of manufacturing the near-field light generator according to claim 8, wherein the etching mask is formed of a metal.

13. The method of manufacturing the near-field light generator according to claim 8, wherein the patterned layer and the adhesion film are each formed of a dielectric material.

14. The method of manufacturing the near-field light generator according to claim 8, wherein the step of forming the accommodation part is performed by reactive ion etching.

\* \* \* \* \*